United States Patent [19]

Trinkwalder

[11] Patent Number: 4,491,149

[45] Date of Patent: Jan. 1, 1985

[54] PRESSURE REGULATOR WITH OVER-PRESSURE SAFETY SHUT-OFF FEATURE

[75] Inventor: Joseph C. Trinkwalder, North Tonawanda, N.Y.

[73] Assignee: Sherwood Selpac Corp., Lockport, N.Y.

[21] Appl. No.: 520,819

[22] Filed: Aug. 5, 1983

[51] Int. Cl.³ .............................................. F16K 31/12
[52] U.S. Cl. .............................. 137/505.46; 137/458; 137/505.47
[58] Field of Search ............... 137/458, 505.46, 505.47

[56] References Cited

U.S. PATENT DOCUMENTS 3,207,175   9/1965   Pauly ................................ 137/505.46
3,809,108   5/1974   Hughes ....................... 137/505.46 X
4,067,354   1/1978   St. Clair ........................... 137/458 X

FOREIGN PATENT DOCUMENTS 590784   6/1925   France ............................ 137/505.46

Primary Examiner—Harold W. Weakley
Attorney, Agent, or Firm—Sommer & Sommer

[57] ABSTRACT

A pressure regulator has an element slidably mounted in a body. A through-bore in the element is arranged to be selectively opened and closed in response to the magnitude of a sensed pressure relative to a predetermined pressure. If such sensed pressure substantially exceeds the predetermined pressure, the element is displaced relative to the body to seat against a high pressure poppet. Such closure of the element through-bore by the high pressure poppet is thereafter maintained, even should the sensed pressure subsequently fall below the predetermined pressure, and requires a manual reset.

5 Claims, 9 Drawing Figures

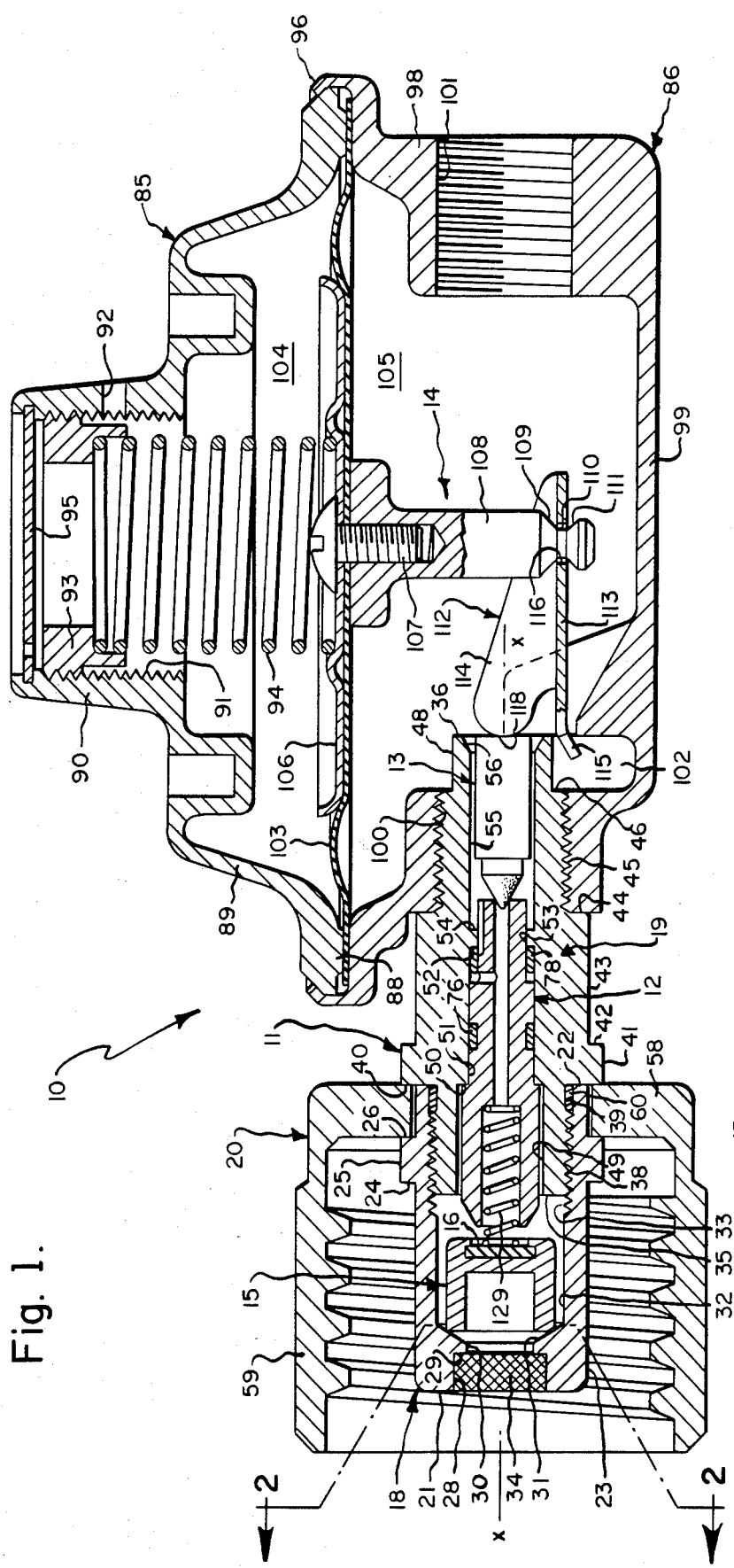

PRESSURE REGULATOR WITH OVER-PRESSURE SAFETY SHUT-OFF FEATURE

BACKGROUND OF THE INVENTION

1. Field of the Invention

The present invention relates generally to the field of pressure regulators, and, more particularly, to an improved pressure regulator which automatically prevents further flow of fluid therethrough if a sensed back pressure exceeds a predetermined pressure by a sufficient amount.

2. Description of the Prior Art

Pressure regulators are commonly used to step-down a relatively-high supply pressure to a lower regulated pressure, which, in turn, is subsequently supplied to an appliance. For example, such pressure regulators are typically used in the supply of liquified petroleum gas (LPG) or propane to gas grills and the like.

Others have recognized the desirability of disabling a regulator, so as to terminate further flow therethrough, in the event that the regulated back pressure substantially exceeds a desired value. Examples of such prior art regulators incorporating such a safety shut-off feature may be shown in one or more of the following U.S. Pat. Nos.: 2,698,026 (Roberts et al.); 4,295,489 (Arends et al.); and 2,969,802 (Rich).

SUMMARY OF THE INVENTION

With parenthetical reference to the corresponding structure or surfaces of the disclosed embodiment for exemplary purposes only, the present invention provides an improved pressure regulator (e.g., 10) which broadly includes: a body (e.g., 11) having a first end (e.g., 35), a second end (e.g., 36), an opening therethrough communicating these body ends, and having a portion extending into the opening to form an abutment surface (e.g., 50) facing toward the body first end, the body first end being exposed to fluid at a relatively-high supply pressure and the body second end being exposed to such fluid at a relatively-low pressure-to-be-regulated; an element (e.g., 12) arranged in the body opening and having a first end (e.g., 61), a second end (e.g., 62), and having a through-bore communicating these ends, the element being mounted for sealed sliding movement along the body opening toword and away from the abutment surface; a regulating poppet (e.g., 13) mounted for movement toword and away from the element second end for controlling the flow of fluid through the bore; an actuator (e.g., 14) arranged to sense the magnitude of the pressure-to-be-regulated and selectively operable to permit the regulating poppet to move away from the element second end when such sensed pressure is less than a predetermined pressure, to cause the regulating poppet to close the element bore when such sensed pressure is substantially equal to the predetermined pressure, and to exert on the element second end a force substantially proportional to the magnitude of the sensed pressure above the predetermined pressure which urges the element to move away from the abutment surface; and a seat (e.g., 128) arranged within the body opening and operative to sealingly close the element first end when the element has moved sufficiently away from the abutment surface to engage the seat, and to thereafter maintain such closed condition until manually reset.

Accordingly, the general object of the invention is to provide an improved pressure regulator.

Another object is to provide an improved pressure regulator having a high back pressure shut-off feature.

Another object is to provide an improved pressure regulator which requires a manual reset operation, as by disconnecting and reconnecting the regulator from the source of supply pressure, in the event of an excessively-high back pressure condition.

Still another object is to provide an improved pressure regulator which is particularly suited for use with domestic appliances, such as gas grills and the like.

These and other objects and advantages will become apparent from the foregoing and ongoing specification, the drawings, and the appended claims.

BRIEF DESCRIPTION OF THE DRAWING FIGURES

FIG. 1 is a longitudinal vertical sectional view of the improved pressure regulator.

FIG. 2 is a fragmentary transverse vertical sectional view thereof, taken generally on line 2—2 of FIG. 1.

FIG. 3 is an enlarged longitudinal vertical sectional view of the high pressure poppet.

FIG. 4 is an enlarged longitudinal vertical sectional view of the element.

FIG. 5 is an enlarged longitudinal vertical sectional view of the regulating poppet.

DESCRIPTION OF THE PREFERRED EMBODIMENTS

Figure 6:
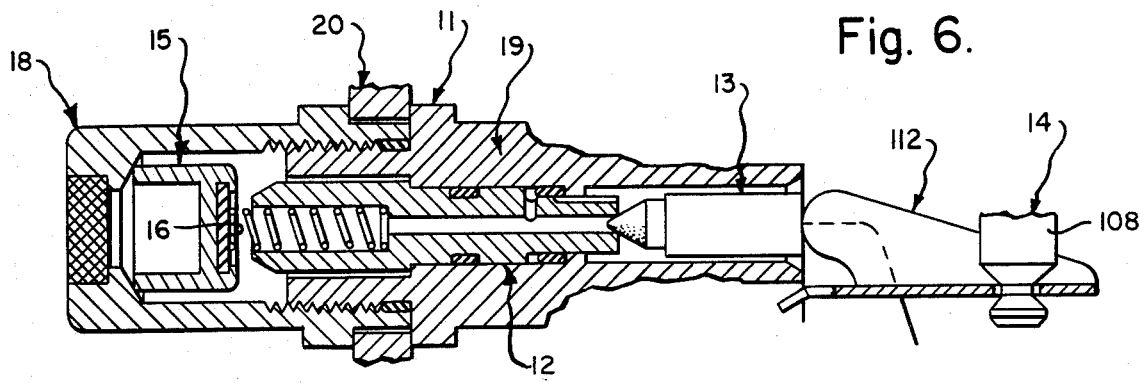
FIG. 6 is a fragmentary view similar to FIG. 1, and showing the regulating poppet as being in its normal flow-preventing closed condition.

At the outset, it should be clearly understood that like reference numerals are intended to identify the same portions or structure consistently throughout the several drawing figures, as such portions or structure may be further described or explained by the entire written specification of which this detailed description is an integral part.

Referring now to the drawings, and, more particularly, to FIG. 1 thereof, this invention provides an improved pressure regulator of which the presently-preferred embodiment is generally indicated at 10. The improved regulator is depicted as broadly including a multi-part body 11, an element 12 within the body, a regulating poppet 13, an actuator 14, and a high pressure poppet 15 provided with a seat 16.

Body 11 is shown as including a left part 18, a right part 19, and a mounting collar 20 sandwiched therebetween.

The body left part 18 includes an annular vertical left end face 21; an annular vertical right end face 22; an outer surface including a cylindrical surface 23 extending rightwardly from left end face 21, a leftwardly-facing annular vertical surface 24, a cylindrical surface 25, a rightwardly-facing annular vertical surface 26, and a cylindrical surface continuing rightwardly therefrom to join right end face 22; and an internal through-opening bounded by a cylindrical surface 28 extending rightwardly from left end face 21, a leftwardly-facing annular vertical surface 29, a cylindrical surface 30, a rightwardly-facing frusto-conical surface 31, a cylindrical surface 32 continuing rightwardly therefrom, and an internally-threaded portion 33 continuing to join right end face 22. A disc-like filter 34 is positioned in the leftward open end of the body left part to screen and separate contaminants from fluid passing therethrough.

The body right part 19 is a specially-configured member having annular vertical left and right end faces 35, 36, respectively; an outer surface including an externally-threaded portion 38, a cylindrical surface 39, a leftwardly-facing annular vertical surface 40 arranged to abut body left part right end face 22, a cylindrical surface 41, a rightwardly-facing annular vertical surface 42, a cylindrical surface 43, a rightwardly-facing annular vertical surface 44, an externally-threaded surface 45 continuing rightwardly therefrom, a rightwardly-facing annular vertical surface 46, and a cylindrical surface 48 joining right end face 36; and a stepped through-opening bounded by cylindrical surface 49 extending rightwardly from left end face 35, a leftwardly-facing annular vertical abutment surface 50, a cylindrical surface 51, a leftwardly-facing annular vertical surface 52, a cylindrical surface 53, a rightwardly-facing annular vertical surface 54, a cylindrical surface 55, and a rightwardly-divergent frusto-conical surface 56 joining right end face 36.

The body mounting collar 20 is a somewhat cup-shaped member having an in-turned annular vertical flange 58, the marginal end portion of which is captured between left part surface 26 and right part surface 40, and has an internally-threaded cylindrical portion 59 extending leftwardly therefrom. This mounting collar is provided to facilitate attachment of the regulator to a suitable source (not shown) of fluid at a relatively-high supply pressure. An example of such source might be a container or "bottle" of liquified petroleum gas (LPG), propane, or the like.

The collective body is formed by assembling the body left and right parts 18, 19, and the mounting collar 20, together as shown. Left part threaded portion 33 is matingly received in right part threaded portion 38, with a sealing O-Ring 60 compressed between the facing surfaces of these body parts. As previously noted, the mounting collar is captured between surfaces 26 and 40.

Referring now to FIGS. 1 and 4, element 12 is a specially-configured member having annular vertical left and right end faces 61, 62, respectively; an outer surface including frusto-conical surface 63 diverging rightwardly and away from left end face 61, cylindrical surface 64, rightwardly-facing annular vertical surface 65, cylindrical surface 66 from which an annular groove or recess 68 extends into the body, a rightwardly-facing annular vertical surface 69, and a cylindrical surface 70 continuing rightwardly therefrom to join right face 62; and a stepped axial through-bore bounded by cylindrical surface 71 extending rightwardly from left end face 61, a leftwardly-facing annular vertical surface 72, and a cylindrical surface 73 continuing rightwardly therefrom to join right end face 62. As best shown in FIG. 4, a radial hole 74 communicates bore surface 73 with outer surface 70 immediately to the right of surface 69. Surface 70 is further provided with a longitudinally-extending groove or recess 75 which begins to the right of hole 74 and continues rightwardly to join right end face 62. Groove 75 does not communicate directly with radial hole 74 because of the presence of a portion of surface 70 therebetween. The element is mounted in the body opening as shown in FIG. 1, with an O-Ring 76 received in element recess 68 so as to sealingly and slidably contact body opening surface 51. Another O-Ring 78 continuously engages body surfaces 51 and 52, and sealingly and slidably engages a proximate portion of element surface 70. Thus, the element is mounted in the body opening for axial sliding movement toward and away from body abutment surface 52. When the element is shifted rightwardly relative to the body to its maximum permissible extent, element surface 65 will engage body abutment surface 50, and O-Ring 78 will engage the portion of element surface 70 between radial hole 74 and longitudinal groove 75, thereby sealingly separating this hole and groove (i.e., FIGS. 1, 6, 7, and 9) for a purpose hereinafter explained. If desired, the proximate portion of the body could be provided with an annular groove or recess (not shown) to receive O-Ring 78 and to insure that it will be retained in this position when element 12 moves relative to the body.

As best shown in FIG. 5, the regulating poppet 13 is a stepped cylindrical solid member having circular vertical left and right faces 79, 80, respectively; and having an outer surface which includes cylindrical surface 81 extending rightwardly from left face 79, a leftwardly-facing annular vertical surface 82, and a cylindrical surface 83 continuing rightwardly therefrom to join right face 80. A solid cone 84 of a resilient material has its circular base arranged to engage left face 79, and has its leftwardly-pointed apex arranged to form a cushioned "nose" of the regulating poppet. As best shown in FIG. 1, the regulating poppet is mounted within the right marginal end portion of the body opening for axial movement toward and away from the right end 80 of the element. When moved sufficiently toward the element, the cushioned "nose" of the regulating poppet will sealingly engage the annular edge between element surfaces 62, 73, and thereby prevent further flow through the element's bore.

Adverting now to FIG. 1, actuator 14 is shown as including a two-part housing having an upper part 85 and a lower part 86 mounted on the body.

The housing upper part 85 is an inverted specially-configured somewhat cup-shaped member having a downwardly-facing and out-turned annular rim or lip 88, a meandering side wall 89, and an uppermost central collar 90 provided with a tapped vertical through-hole 91. A radial hole 92 penetrates the collar 90. A ring 93 is threaded into tapped hole 91 to provide an adjustably-positionable abutment surface for one end of coil spring 94. A retaining ring 95 is mounted in the upper mouth of hole 91 to protect ring 93.

The housing lower part 86 is a specially-configured cup-shaped member having an uppermost annular flange 96 bent to capture and hold the out-turned portion of the upper part rim, a side wall 98, and a bottom 99. Two diametrically-opposite tapped holes 100, 101 are provided through the lower part side wall 98. Hole 100 is adapted to receive threaded insertion of body portion 45. Hole 101 is adapted to receive threaded insertion of a suitable fitting (not shown) by which the regulator may communicate with, and supply fluid to, a suitable appliance (not shown) at a predetermined pressure. The lower part is shown as being further provided with a narrow-mouthed recess 102 immediately beneath hole 100.

A circular diaphragm 103 has a marginal portion adjaced its peripheral edge suitable captured and held between the connected rims of the two housing parts, and sealingly separates the space within the thus-assembled housing into an upper chamber 104 and a lower chamber 105. The upper chamber 104 is vented to atmospheric pressure through hole 92. The lower chamber 105 contains fluid at a pressure-to-be-regulated, this being less than the supply pressure. A plate-like member 106 is mounted on the horizontal upper face of the diaphragm, and is engaged by the other end of compressed coil spring 94. A member 108 depends from the underside of the diaphragm. The central portion of the diaphragm is sandwiched between plate 106 and member 108, and is held in this position by a fastener 107 which holds plate 106 and member 108 securely together. Member 108 is provided with an annular recess adjacent its lower end. This recess is bounded by a downwardly-convergent frusto-conical surface 109, a narrowed cylindrical surface 110, and an upwardly-convergent frusto-conical surface 111.

The actuator 14 is also shown as including a member 112 pivotally mounted on the housing. To this end, member 112 has a horizontal portion 113 and a vertical portion 114. The left marginal end portion 115 of the horizontal portion is received in recess 102, and is struck downwardly relative to the plane of horizontal portion 113 to prevent unintended withdrawal of member 112 from the recess. Adjacent its rightward end, the horizontal portion is provided with a hole 116 which is adapted to encircle surface 110 and be retained in this position by frusto-conical surfaces 109, 111 above and below surface 110. However, member 112 may pivot relative to member 108 because the diameter of hole 116 is greater than the diameter of surface 110. The vertical portion has a leftward convex or rounded surface 118 which is adapted to selectively engage regulating poppet right face 80.

As previously noted, upper chamber 104 is at atmospheric pressure, while lower chamber 105 contains fluid at a pressure to be regulated. Spring 94 is compressed between ring 93 and diaphragm plate 106, and urges the diaphragm to move downwardly. This downward bias is opposed by the pressure of fluid in lower chamber 105, which acts upwardly on the underside of the diaphragm. Thus, the equilibrium position of the diaphragm will be determined by a force balance between the downward force exerted by the spring ($F=kx$), and the opposing upward force exerted by the pressure of fluid ($F=pA$) in chamber 105. It should be noted that rounded surface 118 of member 112 will move pivotally toword and away from the body right face 36 as the diaphragm moves upwardly and downwardly, respectively. Thus, the actuator is arranged to continuously sense the pressure in chamber 105, and to translate such sensed pressure into the position of rounded surface 118 relative to body right end face 36.

Referring now to FIGS. 1 and 3, the high pressure poppet 15 is shown as being a specially-configured member having a square transverse cross-section, a left face 119, and a right face 120. A recess, bounded by cylindrical surface 121 and circular vertical bottom surface 122, extends rightwardly into the high pressure poppet from its left face 119. Another recess, bounded by cylindrical surface 123, leftwardly-facing annular vertical surface 124, cylindrical surface 125, and rightwardly-facing annular vertical bottom surface 126, extends leftwardly into the high pressure poppet from its right face 120. A circular disc 128 of resilient material is received in the high pressure poppet right recess. The rightwardly-facing circular vertical surface of disc 128 forms seat surface 16.

As best shown in FIG. 1, a coil spring 129 has its left end arranged to bear against seat surface 16, and has its right end arranged to bear against element surface 72. Spring 129 continuously urges the high pressure poppet and the element to move away from one another. The action of spring 129 urges the polygonal edge 130 of the high pressure poppet, this edge being formed by the intersection of the square outer surface and planar vertical left face 119, to normally abut body surface 31. However, because edge 130 is polygonal and body surface 31 is frusto-conical (FIG. 2), fluid may normally flow around the high pressure poppet to enter the through-bore of element 12.

So as to make explict that which is implicit, the various cylindrical surfaces of the body, the regulating poppet, the element, and the high pressure poppet, are severally generated about horizontal axis x—x.

Operation

The operation of the improved regulator is comparatively illustrated in FIGS. 6–9. The regulating poppet 13 constitutes the primary means for regulating the pressure in chamber 105. As such, the regulating poppet is continuously exposed to fluid at the pressure in chamber 105, while the high pressure poppet 15 is continuously exposed to the relatively-high supply pressure.

Figure 7:
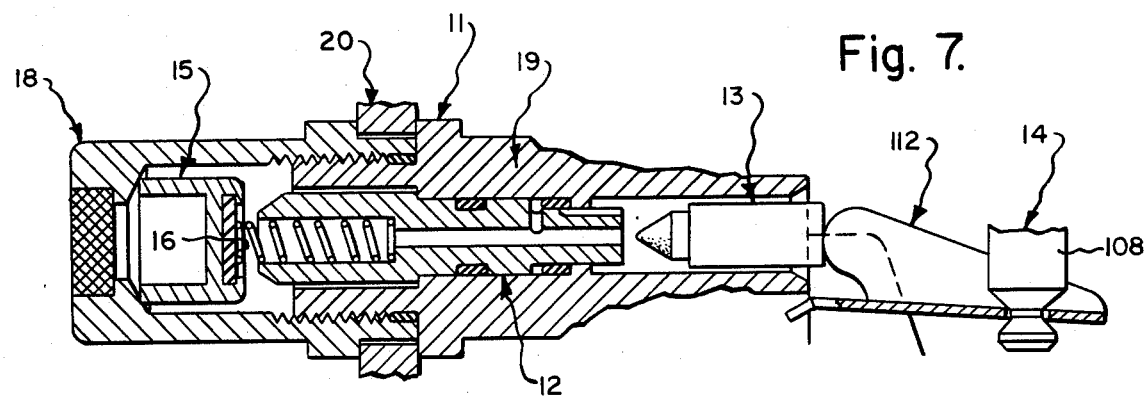
FIG. 7 is a fragmentary view similar to the view of FIG. 6, but showing the regulating poppet as having been moved away from the element to a flow-permitting open condition.

Normal operation of the regulator is illustrated in FIGS. 6 and 7. In this condition, it should be noted that spring 129 urges the high pressure poppet to its extreme leftward position, at which the corners of polygonal edge 130 engage body surface 31 at substantially four points, and also urges the element to move to its extreme rightward position, at which element surface 65 engages body abutment surface 50. O-Ring 78 engages element surface 70 between hole 74 and groove 75, and sealingly separates these two flow passageways. Thus, fluid, at the relatively-high supply pressure, enters body 11 through filter 34, passes around the high pressure poppet, and enters the element through-bore. The diaphragm continuously senses the pressure in chamber 105. When such sensed pressure equals a predetermined pressure, the diaphragm moves to a position such that rounded surface 118 will cause the regulating poppet to move toward and close the rightward end of the element through-bore (FIG. 6), thereby preventing further flow into chamber 105.

However, should the pressure in chamber 105 fall below the predetermined value, as by fluid in chamber 105 having been delivered to the serviced appliance (not shown), the diaphragm will move downwardly, thereby causing the rounded surface 118 to move away from the body right edge 36. This allows the relatively-high supply pressure in the element through-bore to displace the regulating poppet rightwardly until its right face bottoms against surface 118 (FIG. 7), and also permits fluid to enter chamber 105. The relative positions of the element and the regulating poppet are somewhat exaggerated in FIG. 7 for illustrative purposes only. In actual practice, the right end face of the regulating poppet will be in continuous contact with rounded surface 118.

When supply pressure is so admitted to chamber 105, the pressure therein may begin to rise, depending upon the demand requirements of the appliance at that point in time. Ultimately, the pressure in chamber 105 will rise, thereby causing the diaphragm to move upwardly, and, concomitantly, causing rounded surface 118 to displace the regulating poppet leftwardly to again seat against and close the right end of the element throughbore when such pressure again equals the predetermined pressure.

Figure 8:
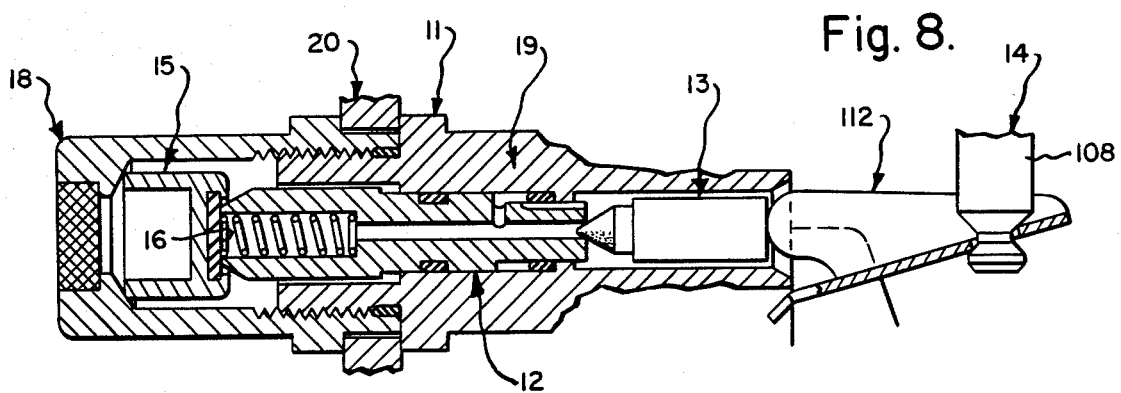
FIG. 8 is a fragmentary view similar to the view of FIG. 6, but showing the actuator as having displaced the regulating poppet and the element leftwardly relative to the body to engage the high pressure poppet.

Should the pressure in chamber 105 substantially exceed the predetermined pressure, the diaphragm will move further upwardly and cause the rounded surface 118 to displace the regulating poppet and the element leftwardly until the element left end sealingly engages high pressure poppet seat surface 16, as shown in FIG. 8. Such movement is accommodated by further compression of spring 129. Such leftward movement of the element establishes fluid communication between element hole 74 and groove 75. Thus, the pressure in the element through-bore will equalize with the pressure in chamber 105 even though the regulating poppet is in fluid-tight sealing engagement with the right end of the element. Since the left end of the element is sealingly engaged with seat surface 16, the relatively-high supply pressure is prevented from entering the element through-bore.

Figure 9:
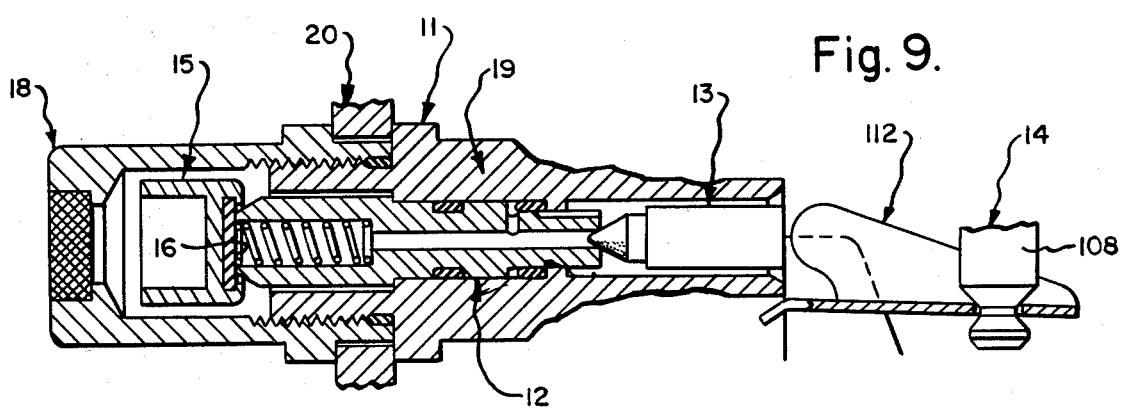
FIG. 9 is a fragmentary view similar to the view of FIG. 8, but showing the regulating poppet, the element, and the high pressure poppet, as having moved rightwardly relative to the body from the position shown in FIG. 8.

FIG. 9 illustrates the relative positions of the various parts should the over-pressure condition in chamber 105 subsequently fall from that which caused the condition in FIG. 8, to a value lower than the predetermined pressure. As previously noted, the pressure in the element through-bore was permitted to equalize with the pressure in chamber 105 (FIG. 8). Hence, the differential pressure between the supply pressure and the pressure in the element through-bore, will continue to hold the high pressure poppet tightly against the element left end. However, should the pressure in chamber 105 now fall, rounded surface 118 will move away from the body right end. The relatively-high supply pressure will displace the high pressure poppet, the element, and the regulating poppet, rightwardly as a unit relative to the body until element surface 65 again bottoms on body abutment surface 50. If the pressure in chamber 105 continues to fall, rounded surface 118 may actually separate from the right end face of the regulating poppet because there is no flow through the element through-bore. The various parts will remain in this flow-preventing condition until release of the supply pressure acting on the high pressure poppet, as by disconnecting the regulator from the source. Thus, the improved regulator incorporates the feature of requiring a manual reset in the event that the pressure in chamber 105 exceeds the predetermined pressure by an amount needed to cause the condition shown in FIG. 8. Persons skilled in this art will appreciate that the leftward force exerted by rounded surface 118 on the regulating poppet will be substantially proportional to the magnitude of the amount by which the pressure in chamber 105 exceeds the predetermined pressure. It should also be noted that if the pressure in chamber 105 rises to some intermediate value greater than that needed to cause the regulating poppet to simply seat against the element right face (FIG. 6), but less than that need to cause the element left end to seat against surface 16 (FIG. 8), the element will move leftwardly for a distance determined by the magnitude of such pressure, but then return rightwardly to its normal position (FIG. 6) if such pressure is released.

Of course, the invention contemplates that many changes and modifications may be made. The shape and configuration of the various parts may be changed to the extent desired, albeit consistent with their intended purpose and function. Other types of actuators may be substituted for actuator 14. The serviced fluid may be either a liquid or a gas. Of course, the various parts may be formed either integrally or separately, as desired.

Therefore, while the presently-preferred embodiment of the improved pressure regulator has been shown and described, and several changes and modifications thereof discussed, persons skilled in this art will readily appreciate that various additional changes and modifications may be made without departing from the spirit of the invention, as defined and differentiated by the following claims.

What is claimed is:

1. A pressure regulator, comprising:
   a body having a first end, a second end, a through-opening communicating said ends, and having a portion extending into said opening to form an abutment surface facing toward said body first end, said body first end being exposed to fluid at a relatively-high supply pressure, said body second end being exposed to said fluid at a relatively-low pressure-to-be-regulated;
   an element arranged in said body opening and having a first end, a second end, and a through-bore communicating said ends, said element being mounted for sealed sliding movement along said body opening toward and away from said abutment surface;
   a regulating poppet mounted for movement toward and away from said element second end for controlling the flow of fluid through said through-bore;
   an actuator arranged to sense the magnitude of such regulated pressure and selectively operable to permit said regulating poppet to move away from said element second end when such sensed pressure is less than a predetermined pressure, to cause said regulating poppet to close said element through-bore when such sensed pressure is substantially equal to said predetermined pressure, and to exert on said element second end a force substantially proportional to the magnitude of such sensed pressure above said predetermined pressure which urges said element to move away from said abutment surface;
   a seat arranged within said body opening and operative to sealingly close said element first end when said element has moved sufficiently away from said abutment surface to engage said seat; and
   a vent passageway provided between said element and body and operable to selectively communicate said element through-bore with said regulated pressure when said regulating poppet has closed said element through-bore and when said element has been moved away from said abutment surface to engage said seat.

2. A pressure regulator as set forth in claim 1 and further comprising:
   a high pressure poppet arranged in said body opening and movable relative to said element first end, and wherein said seat surface is provided on said high pressure poppet.

3. A pressure regulator as set forth in claim 2 wherein said high pressure poppet and said element first end are biased to move away from one another.

4. A pressure regulator as set forth in claim 2 wherein said high pressure poppet is mounted for movement relative to said body.

5. A pressure regulator as set forth in claim 4 wherein said body has a portion extending into said opening to provide a surface arranged to face toword said body second end to provide a limit for movement of said high pressure poppet.

* * * * *